Jan. 11, 1966   R. T. BRYAN   3,228,846
BOILING WATER NUCLEAR REACTOR WITH BREEDER
BLANKET SUPERHEATER
Original Filed Nov. 30, 1955

INVENTOR.
Roland T. Bryan
BY
ATTORNEY

United States Patent Office 3,228,846
Patented Jan. 11, 1966

3,228,846
BOILING WATER NUCLEAR REACTOR WITH BREEDER BLANKET SUPERHEATER
Roland T. Bryan, Riverside, Conn., assignor to The Babcock & Wilcox Company, New York, N.Y., a corporation of New Jersey
Continuation of application Ser. No. 549,937, Nov. 30, 1955. This application Mar. 6, 1961, Ser. No. 93,802
8 Claims. (Cl. 176—18)

This application is a continuation of my prior application Serial No. 549,937, filed November 30, 1955, now abandoned.

This invention relates in general to a nuclear reactor and, more specifically, it relates to an improved breeder-converter reactor in which the breeding blanket is cooled by superheated steam.

One of the most important and best developed type of nuclear reactor presently in use is one in which the coolant is pressurized water, either light or heavy. This type of reactor has taken various forms, such as an aqueous homogeneous reactor in which the fuel is dissolved as uranyl sulphate in water; one using solid fuel elements in which the water is pumped through the elements to cool them or in which the water boils; and another having solid fuel elements which are graphite moderated and water cooled. A common characteristic of these reactors is that the operating temperature of the water is limited to something less than the critical temperature of water because of the water's physical properties. Therefore, when adapting these reactors to power generation, all of the power cycles involve the use of low temperature saturated steam. Accordingly, the resultant power from the steam cycle is generated at a low thermal efficiency compared to fossil fuel fired power generating cycles. This low efficiency is due primarily to the absence of high temperature superheated steam for use in the cycle.

It has been proposed that the reactor furnished low temperature saturated steam be heated in a separate fossil fuel fired superheater which would permit the use of a power generation cycle of high thermal efficiency. This proposal, although producing power at a lower cost, requires dual fuel services for the reactor and the superheater. This dual arrangement necessarily complicates the operation. Further, as atomic energy is to supplement fossil fuel as a primary source of power, it is considered to be an intermediary step in the eventual evolution of atomic energy as a primary heat source.

Accordingly, the present invention provides a method and apparatus of operating a thermal type nuclear reactor having fissile fuel elements in a core chamber and fertile material elements arranged in a closed blanket chamber which longitudinally embraces the core chamber. Means are provided for generating steam from the heat released in the core and superheating the steam by the heat released in the fertile material of the blanket. The fertile material and fuel elements are arranged to be interchangeably positioned and their position is programmed in respect to time of exposure in the reactor so that the percentage of heat absorbed in the blanket compared to the heat given up in the core is a substantially constant ratio over a long period of operation.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which I have illustrated and described an embodiment of my invention.

Figure 1:
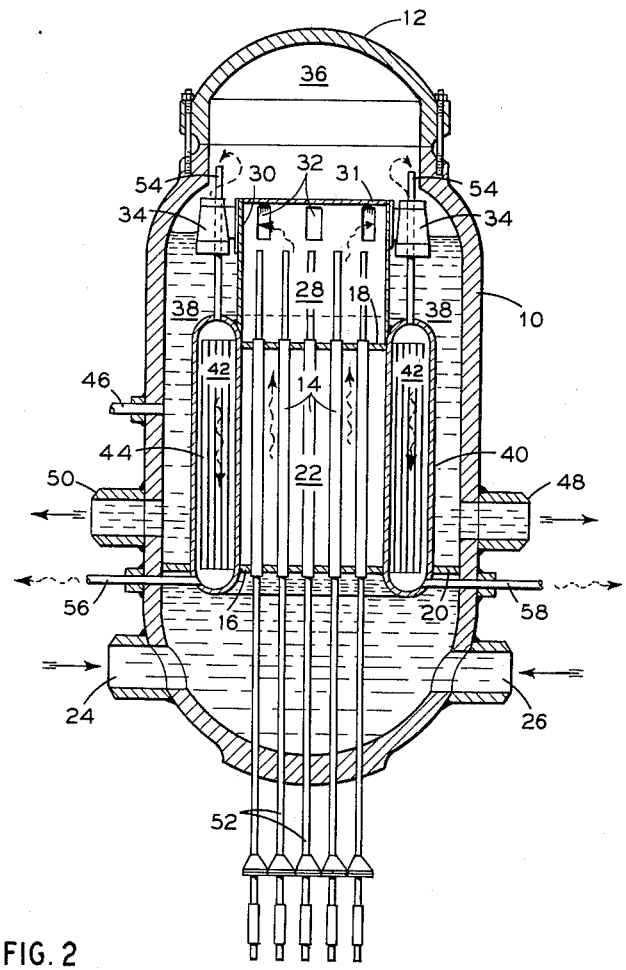
FIG. 1 is a vertical section through the reactor of the invention.

In FIG. 1 there is a boiling water nuclear reactor including a vertically elongated pressure vessel 10 with a large diameter removable closure 12 at its upper end and having a plurality of removable solid fuel elements 14 arranged in a lattice within the central portion of the vessel 10. The fuel elements along with baffles 16, 18 and 20 form a core chamber 22 arranged with cooling water inlets 24 and 26 so that the water flows in at the bottom of the pressure vessel 10 and up through the bundle of fuel elements 14 during which period the water boils. After the water passes through the fuel elements it enters into a steam-water mixture chamber 28 formed by a vertical circular baffle 30 and a top closure baffle 31. The steam-water mixture then enters a multiplicity of openings 32 through the wall 30 of the chamber 28 and passes into a ring of hollow upright whirl chamber steam separators 34 into the upper vapor space 36 of the pressure vessel 10 and the separated liquid passes out through the bottom of the separators into the liquid space 38.

An annular shaped baffle means 40 forms a closed fertile material blanket chamber 42 which longitudinally embraces the fuel elements 14 within the core chamber 22. Disposed within the blanket chamber is a plurality of solid fertile material elements 44. As examples, the fertile material may be natural uranium 238 or thorium. In some cases the fertile material may contain small percentages of fissile material, such as uranium 233, uranium 235 and plutonium. The blanket chamber 44 is arranged so that the baffle walls 40 are spaced from the walls of the pressure vessel 10 to provide a space 38 normally filled with separated water which acts as a neutron reflector. The reflection function of the liquid space is further enhanced by having the cold feed water enter the cycle through the nozzle 46 thus mixing the feed water with the saturated separated water which results in a mixture at a lower temperature and a higher density. This mixture will have neutron reflecting properties better than those of saturated water. The cooling liquid for the reactor leaves through the nozzles 48 and 50.

There is also provided a plurality of reactor control rod assemblies 52 which are arranged to pass through the lower portion of the pressure vessel 10 to control the nuclear reactions in the core.

The separated steam from the steam space 36 passes down the plurality of steam delivery tubes 54 into the blanket chamber 42 where the steam removes the heat incident to the conversion process and passes through the outlet lines 56 and 58 to the point of use. There may be disposed within the blanket chamber some moderating means, such as graphite sheets, either in the elements themselves or exteriorly of the elements.

The fertile material elements 44 and the fuel elements 14 are so constructed and arranged that they are interchangeable. Therefore, as the reactor proceeds with the fuel burning and fertile material conversion the individual elements are changed in position to utilize the burn-up and conversion rates of each of the materials for longer life of the elements themselves and to maintain a substantially constant ratio between the heat released in the core and the heat released in the blanket. By the shifting, each element at each loading period in accordance with its burn-up or conversion rate, it is possible to maintain a rough control of the superheat in the steam. Further, this arrangement is particularly adapted for both generating and superheating the steam without ever having the steam pass out of the pressure vessel. Thus there is provided a nuclear steam generator and superheater which is compact and which can be both built and operated at a greatly reduced cost over that of the present day nuclear power plants.

Figure 2:
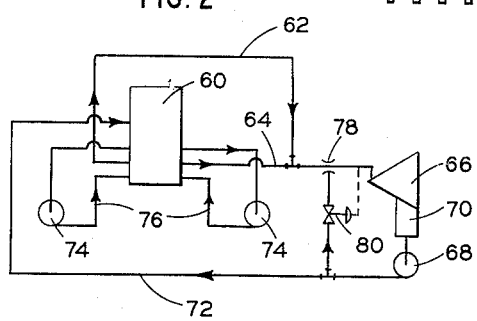
FIG. 2 is a schematic diagram of the reactor of FIG. 1 in a power cycle.

In FIG. 2 the reactor of FIG. 1 is indicated schematically in a power cycle wherein the reactor 60 delivers steam through the superheat lines 62 and 64 to the power turbine 66. A pump 68 takes the water out of the turbine condenser 70 and pumps it via the feed line 72 to the reactor. To be sure that the circulation within the reactor is adequate, there is provided the forced circulation pumps 74 in the two circulating lines 76. The circulating lines 76 are connected to the respective inlets 24 and 26 and outlets 48 and 50 of the reactor pressure vessel 10.

As referred to above, the programming of the positions of the various reactor fuel and fertile material elements roughly controls the superheat of the unit; however, the prime mover usually requires a constant or at least a limited temperature. Therefore, there is provided a steam desuperheating device 78 in which the cool feed water from the line 72 is controllably sprayed into the high temperature steam in response to the temperature changes thereof by the control device 80. The control device 80 and the attemperator may be any of the types well known in the art. By combining the structural characteristics of the reactor with the programming arrangement to produce a rough control of superheat in conjunction with the desuperheater, there is provided a steam generator and superheater which delivers a controlled steam temperature to a prime mover.

The term "water" as used herein means either heavy or light water with the selection being dictated by the fissile fuel, geometry and/or materials of construction of the reactor.

The invention is described as applying to a boiling heterogeneous fuel and fertile material type reactor but those skilled in the art will recognize that it may be equally effectively applied to a boiling homogeneous reactor having solid fertile material elements. Alternatively the invention may be used in a non-boiling heterogeneous reactor in which the core heat forms steam at a position remote from the reactor and the steam is superheated as it passes through the blanket chamber in contact with solid fertile material elements.

While in accordance with the provisions of the statutes I have illustrated and described herein a specific form of the invention now known to me, those skilled in the art will understand that changes may be made in the form of the apparatus disclosed without departing from the spirit of the invention covered by my claims, and that certain features of the invention may sometimes be used to advantage without a corresponding use of the other features.

What is claimed is:

1. A boiling water nuclear reactor comprising a pressure vessel having an upper steam space and lower water space, means forming an upright core chamber occupying a substantial volume within said water space, a plurality of removable solid fissile fuel elements operably arranged in said core chamber to release heat during the chain reaction, said reactor being normally operable under conditions of temperature and pressure such that the water in said pressure vessel is in the boiling state, a plurality of mechanical steam and water separating devices superjacent the core chamber and arranged to separate a steam-water mixture received therefrom, means forming a closed fertile material blanket chamber longitudinally embracing said core chamber, a plurality of fertile material elements operably arranged in said blanket chamber to emit heat in the presence of a high neutron flux, and steam conduit means arranged to pass steam from said steam and water separating devices through said blanket chamber while cooling the fertile material therein and superheating the steam.

2. A boiling water nuclear reactor comprising a pressure vessel having an upper steam space and lower water space, means forming an upright core chamber occupying a substantial volume within said water space, a plurality of removable solid fissile fuel elements operably arranged in said core chamber to release heat during the chain reaction, said reactor being normally operable under conditions of temperature and pressure such that the water in said pressure vessel is in the boiling state, a plurality of mechanical steam and water separating devices superjacent the core chamber and arranged to separate a steam-water mixture received therefrom, means forming a closed fertile material blanket chamber longitudinally embracing said core chamber, a plurality of fertile material elements operably arranged in said blanket chamber to emit heat in the presence of a high neutron flux, and steam conduit means arranged to pass steam from said steam and water separating devices through said blanket chamber while cooling the fertile material therein and superheating the steam, said blanket chamber being arranged in spaced relation with said pressure vessel to provide an annular space for a body of water embracing said blanket chamber and acting as a neutron reflector.

3. In a nuclear reactor, walls forming a pressure vessel, having an upper steam space and lower water space, means forming an upright core chamber occupying a substantial volume within the water space within said vessel, a plurality of removable solid fissile fuel elements operably arranged in said core chamber to release heat during a chain reaction, steam-water separating means arranged to separate the steam from a steam-water mixture received from said core chamber, means forming a closed fertile material blanket chamber longitudinally embracing said core chamber and submerged in said water space, a plurality of fertile material elements operably arranged in said blanket chamber to emit heat in the presence of a high neutron flux, steam conduit means arranged to pass steam from said steam space through said blanket chamber while cooling the fertile material and superheating the steam, said steam-water separating means including a baffle forming a steam-water mixture chamber superjacent and in communication with said core chamber, and a plurality of hollow upright whirl chambers arranged to receive a steam-water mixture from said steam-water mixture chamber.

4. In a nuclear reactor, walls forming a pressure vessel, having an upper steam space and lower water space, means forming an upright core chamber occupying a substantial volume within the water space within said vessel, a plurality of removable solid fissile fuel elements operably arranged in said core chamber to release heat during a chain reaction, steam-water separating means arranged to separate the steam from a steam-water mixture received from said core chamber, means forming a closed fertile material blanket chamber longitudinally embracing said core chamber and submerged in said water space, a plurality of fertile material elements operably arranged in said blanket chamber to emit heat in the presence of a high neutron flux, steam conduit means arranged to pass steam from said steam space through said blanket chamber while cooling the fertile material and superheating the steam, said steam-water separating means including a baffle forming a steam-water mixture chamber superjacent and in communication with said core chamber, a plurality of hollow upright whirl chambers arranged to receive a steam-water mixture from said steam-water mixture chamber, and said fuel elements and fertile material elements arranged to be interchangeably positioned with each of a like kind to maintain a predetermined ratio of heat generation rate in said blanket to said core chamber.

5. In a nuclear reactor, walls forming a pressure vessel, having an upper steam space and lower water space, means forming an upright core chamber occupying a substantial volume within the water space within said vessel, a plurality of removable solid fissile fuel elements, operably arranged in said core chamber to release heat during a chain reaction, steam-water separating means arranged to separate the steam from a steam-water mixture received from said core chamber, means forming a closed fertile material blanket chamber longitudinally embracing said core chamber and submerged in said water space, a plurality of fertile material elements operably arranged in said blanket chamber to emit heat in the presence of a high neutron flux, steam conduit means arranged to pass steam from said steam space through said blanket chamber while cooling the fertile material and superheating the steam, said steam-water separating means including a baffle forming a steam-water mixture chamber superjacent and in communication with said core chamber, and a plurality of hollow upright whirl chambers arranged to receive a steam-water mixture from said steam-water mixture chamber, and said blanket chamber arranged spaced from said pressure vessel walls to provide for a body of water embracing said blanket to act as a neutron reflector.

6. In a nuclear reactor, walls forming a pressure vessel, having an upper steam space and lower water space, means forming an upright core chamber occupying a substantial volume within the water space within said vessel, a plurality of removable solid fissile fuel elements operably arranged in said core chamber to release heat during a chain reaction, steam-water separating means arranged to separate the steam from a steam-water mixture received from said core chamber, means forming a closed fertile material blanket chamber longitudinally embracing said core chamber and submerged in said water space, a plurality of fertile material elements operably arranged in said blanket chamber to emit heat in the presence of a high neutron flux, steam conduit means arranged to pass steam from said steam space through said blanket chamber while cooling the fertile material and superheating the steam, said steam-water separating means including a baffle forming a steam-water mixture chamber superjacent and in communication with said core chamber, a plurality of hollow upright whirl chambers arranged to receive a steam-water mixture from said steam-water mixture chamber, and steam attemperating means arranged to limit the steam temperature leaving said blanket chamber.

7. In a nuclear reactor, walls forming a pressure vessel, having an upper steam space and lower water space, means forming an upright core chamber occupying a substantial volume within the water space within said vessel, a plurality of removable solid fissile fuel elements operably arranged in said core chamber to release heat during a chain reaction, steam-water separating means arranged to separate the steam from a steam-water mixture received from said core chamber, means forming a closed fertile material blanket chamber longitudinally embracing said core chamber and submerged in said water space, a plurality of fertile material elements operably arranged in said blanket chamber to emit heat in the presence of a high neutron flux, steam conduit means arranged to pass steam from said steam space through said blanket chamber while cooling the fertile material and superheating the steam, said steam-water separating means including a baffle forming a steam-water mixture chamber superjacent and in communication with said core chamber, a plurality of hollow upright whirl chambers arranged to receive a steam-water mixture from said steam-water mixture chamber, said fuel elements and fertile material elements arranged to be interchangeably position with each of a like kind to maintain a predetermined ratio of heat generation rate in said blanket to said core chamber, and said blanket chamber arranged spaced from said pressure vessel walls to provide for a body of water embracing said blanket to act as a neutron reflector.

8. In a nuclear reactor, walls forming a pressure vessel, having an upper steam space and lower water space, means forming an upright core chamber occupying a substantial volume within the water space within said vessel, a plurality of removable solid fissile fuel elements operably arranged in said core chamber to release heat during a chain reaction, steam-water separating means arranged to separate the steam from a steam-water mixture received from said core chamber, means forming a closed fertile material blanket chamber longitudinally embracing said core chamber and submerged in said water space, a plurality of fertile material elements operably arranged in said blanket chamber to emit heat in the presence of a high neutron flux, steam conduit means arranged to pass steam from said steam space through said blanket chamber while cooling the fertile material and superheating the steam, said steam-water separating means including a baffle forming a steam-water mixture chamber superjacent and in communication with said core chamber, a plurality of hollow upright whirl chambers arranged to receive a steam-water mixture from said steam-water mixture chamber, said fuel elements and fertile material elements arranged to be interchangeably positioned with each of a like kind to maintain a predetermined ratio of heat generation rate in said blanket to said core chamber, said blanket chamber arranged spaced from said pressure vessel walls to provide for a body of water embracing said blanket to act as a neutron reflector, and steam attemperating means arranged to limit the steam temperature leaving said blanket chamber.

References Cited by the Examiner

UNITED STATES PATENTS

| | | | |
|---|---|---|---|
| 2,550,683 | 5/1951 | Fletcher et al. | 122—479 |
| 2,640,468 | 6/1953 | Armacost | 122—479 |
| 2,648,397 | 8/1953 | Ravese et al. | 122—491 |
| 2,732,028 | 1/1956 | Coulter | 122—491 |
| 2,743,225 | 4/1956 | Ohlinger et al. | 176—58 |
| 2,787,593 | 4/1957 | Metcalf | 176—54 |
| 2,806,820 | 9/1957 | Wigner | 176—54 |
| 2,812,303 | 11/1957 | Daniels | 176—37 |
| 2,938,845 | 5/1960 | Treshow | 176—54 |
| 2,954,335 | 9/1960 | Wigner | 176—18 |
| 2,975,117 | 3/1961 | Zinn | 176—18 |
| 2,987,458 | 6/1961 | Breden et al. | 176—54 |
| 2,990,348 | 6/1961 | Wollan | 176—54 |
| 2,992,174 | 7/1961 | Edlund et al. | 176—18 |

CARL D. QUARFORTH, *Primary Examiner.*

ROGER L. CAMPBELL, LEON D. ROSDOL, REUBEN EPSTEIN, *Examiners.*